(12) United States Patent
Jin (10) Patent No.: US 9,359,030 B2
(45) Date of Patent: Jun. 7, 2016

(54) DOOR HINGE LOADING DEVICE FOR VEHICLE

(71) Applicants: Hyundai Motor Company, Seoul (KR); Kia Motors Corporation, Seoul (KR)

(72) Inventor: Taeheun Jin, Gyeongsangbuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 117 days.

(21) Appl. No.: 14/278,034

(22) Filed: May 15, 2014

(65) Prior Publication Data

US 2015/0183474 A1    Jul. 2, 2015

(30) Foreign Application Priority Data

Jan. 2, 2014   (KR) .................. 10-2014-0000269

(51) Int. Cl.
  *B62D 65/02*  (2006.01)
  *B25J 11/00*  (2006.01)
  *B62D 65/06*  (2006.01)
(52) U.S. Cl.
  CPC ............. *B62D 65/024* (2013.01); *B25J 11/005* (2013.01); *B62D 65/06* (2013.01)
(58) Field of Classification Search
  CPC ...................................................... B62D 65/06
  USPC ................................................... 414/225.01
  See application file for complete search history.

(56) References Cited

U.S. PATENT DOCUMENTS

| 5,222,290 | A * | 6/1993 | Kvalheim | ............. | B23P 19/003 |
| | | | | | 269/905 |
| 2005/0055824 | A1* | 3/2005 | Jung | ...................... | B62D 65/06 |
| | | | | | 29/719 |

FOREIGN PATENT DOCUMENTS

KR   10-2010-0035328 A   4/2010

* cited by examiner

*Primary Examiner* — Ernesto Suarez
*Assistant Examiner* — Ronald Jarrett
(74) *Attorney, Agent, or Firm* — Mintz Levin Cohn Ferris Glovsky and Popeo, P.C.; Peter F. Corless (57) ABSTRACT

A door hinge loading device for a vehicle includes a door hinge storage that is attached to an attachment frame, where one or more door hinges are loaded on the door hinge storage, a clamping unit that extracts the door hinges from the door hinge storage, and clamps the extracted door hinges while aligning bolts, and a moving unit that is provided at a position corresponding to the clamping unit to be connected to the clamping unit, and selectively moves the clamping unit toward the door hinge storages.

9 Claims, 5 Drawing Sheets

DOOR HINGE LOADING DEVICE FOR VEHICLE

CROSS-REFERENCE TO RELATED APPLICATION

The present application claims priority under 35 U.S.C. §119(a) of Korean Patent Application Number 10-2014-0000269 filed on Jan. 2, 2014, the entire contents of which are incorporated herein by reference.

BACKGROUND (a) Field of Invention

The present invention relates to a door hinge loading device for a vehicle, and more particularly, to a door hinge loading device for loading front and rear door hinges to a moving range of an install robot while automatically extracting and aligning the front and rear door hinges loaded on hinge storages.

(b) Description of Related Art

In general, vehicles are manufactured by mass production including several processes in which approximately 20,000 to 30,000 components are assembled.

Particularly, in a first step of manufacturing a vehicle, after a vehicle body panel is produced in a press process, the produced vehicle body panel is transferred to a vehicle body plant, and each part of a vehicle body is assembled to produce the vehicle body of a BIW (Body In White) state.

Side wall surfaces, a roof, and a rear panel are attached to the finished vehicle body in a main body process, and the vehicle body is painted in a painting process. Subsequently, an engine, a transmission, and internal and external members are assembled with the painted vehicle body in an assembly plant to finish the vehicle.

In particular, a process of attaching a door to the vehicle body includes a process of attaching door hinges to front and rear pillars of a side panel and a process of fastening the door to the door hinges in a subsequent process.

When the vehicle body is positioned at an operation position through a conveyer system, the process of attaching the door hinges is performed by closely bringing the door hinges into contact with upper and lower mounting units of the front and rear pillars by using a door-hinge attaching jig and fastening the door hinges to the door hinge mounting units by using bolts.

The door-hinge attaching jig is moved in a forward direction toward the side panel of the vehicle body while the door hinges are loaded to insert tooling pins into the vehicle body, and the vehicle body is clamped to position the door at the upper and lower door hinge mounting units of the front and rear pillars.

In such a state, an operator manually fastens the door hinges to the door hinge mounting units through the bolts by using an electric fastening device.

However, in the process of attaching the door hinges described above, since the door hinges are loaded to a position of the attaching jig and the door hinges are fastened to the hinge mounting units, labor cost of the operator may be increased due to the manual labor.

Further, in the process of attaching the door hinges, since the door hinges are manually fastened, an assembly variation of the door hinges may be caused due to carelessness of the operator. For this reason, the door may be deformed, and quality of an external appearance may be degraded.

Due to the above-stated problems, since the door hinges are reattached in the subsequent process, it may take a lot of time to perform quality maintenance, so that productivity may be decreased.

The above information disclosed in this Background section is only for enhancement of understanding of the background of the invention and therefore it may contain information that does not form the prior art that is already known in this country to a person of ordinary skill in the art.

SUMMARY

The present invention provides a door hinge loading device for a vehicle having advantages of loading front and rear door hinges to a moving range of an install robot while automatically extracting and aligning the front and rear door hinges loaded on hinge storages.

An exemplary embodiment of the present invention provides a door hinge loading device for a vehicle including: a door hinge storage that is attached to an attachment frame, where one or more door hinges are loaded on the door hinge storage; a clamping unit that extracts the door hinges from the door hinge storage, and clamps the extracted door hinges while aligning bolts; and a moving unit that is provided at a position corresponding to the clamping unit to be connected to the clamping unit, and selectively moves the clamping unit toward the door hinge storages.

The attachment frame may be provided on a base plate disposed at a ground of a working place.

The clamping unit may include an up and down cylinder that includes an operation rod, is connected to the moving unit, and is provided to be moved back and forth on the base plate along with operation of the moving unit, an up and down plate that is attached to the up and down cylinder to be selectively raised or lowered by the up and down cylinder, beaters that are respectively attached to both ends of the up and down plate in a longitudinal direction so as to correspond to a position of the hinge storage, clamping cylinders that include operation rods, and are hinge-connected to the beaters, clampers that are hinge-connected to front ends of the beaters and having rear ends that are hinge-connected to the operation rods of the clamping cylinders, and alignment units that are attached to both sides on the up and down plate in the longitudinal direction so as to correspond to front ends of the clampers, and align the bolts of the door hinges.

The alignment units may include mounting blocks that are respectively provided on both sides of a top surface of the up and down plate; and alignment cylinders that clamp the bolts attached to the door hinges that are respectively positioned on the mounting blocks through bolt clampers to align the bolts.

The bolt clampers may be disposed at both sides of the bolt with the bolt interposed therebetween, and are moved toward the bolt by operation of the alignment cylinder.

The mounting blocks may be provided with guiders that respectively guide the door hinges mounted on the mounting blocks.

The moving unit may include a moving cylinder that includes an operation rod, and is provided on the top surface of the base plate at the position corresponding to the clamping unit, a moving plate that is connected to a front end of the operation rod of the moving cylinder, is provided to be slidably moved on the base plate, and mounts the clamping unit on one side thereof, and a guide rail that guides movement of the moving plate between the base plate and the moving plate.

The moving plate may be connected to the guide rail through a rail block attached to the guide rail on the guide rail.

The base plate may be provided with one or more detecting sensors that detect the position of the clamping unit moved by the moving unit.

The detecting sensors may be respectively provided on the base plate at a position of the door hinge storage, and a position where the door hinges extracted from the door hinge storage are loaded.

The door hinge storage may include a pair of first door hinge storages attached to one side on the attachment frame, where a plurality of front door hinges are loaded on the pair of first door hinge storages; and a pair of second door hinge storages attached to the other side of the attachment frame at positions spaced apart from the first door hinge storages, where a plurality of rear door hinges are loaded on the pair of second door hinge storages.

According to an exemplary embodiment of the present invention, unlike the conventional technology in which door hinges are manually aligned, in the door hinge loading device of the present invention, while the front and rear door hinges loaded on the hinge storages are extracted and aligned, the front and rear door hinges are clamped to be automatically loaded to the moving range of an install robot. Further, since the door hinge loading device can be used for door hinges having different sizes for different vehicle models, it is possible to apply the door hinge loading device to various vehicle models in common.

Further, in the exemplary embodiment of the present invention, since the door hinges can be automatically aligned before the door hinges are attached to the vehicle body, it is possible to improve productivity due to the attachment of the door hinges to the vehicle body, and it is possible to reduce manufacturing cost such as labor cost of an operator due to manual labor.

Furthermore, when the door hinges are attached by the install robot by automatically aligning the bolts attached to the door hinges, since an assembly variation of the door hinges is reduced, it is possible to further improve assembly quality. As a result, it is possible to prevent deformation of the door and a decrease in quality of an external appearance due to the assembly variation.

A method of loading door hinges in manufacturing a vehicle includes: loading one or more door hinges on a door hinge storage, the door hinge storage being attached to an attachment frame; extracting the door hinges from the door hinge storage by a clamping unit; clamping the extracted door hinges while aligning bolts by the clamping unit; and selectively moving the clamping unit toward the door hinge storage by a moving unit that is provided at a position corresponding to the clamping unit to be connected to the clamping unit.

DETAILED DESCRIPTION OF THE EMBODIMENTS

An exemplary embodiment of the present invention will hereinafter be described in detail with reference to the accompanying drawings. It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, in the following detailed description, the terms 'first,' etc. given to components having the same configuration are only used to distinguish one component from another, and the terms do not necessarily denote any order in the following detailed description.

Furthermore, terms " . . . unit," " . . . means," " . . . part," and " . . . member" means a unit of a comprehensive configuration that performs at least one function or operation.

Figure 1:
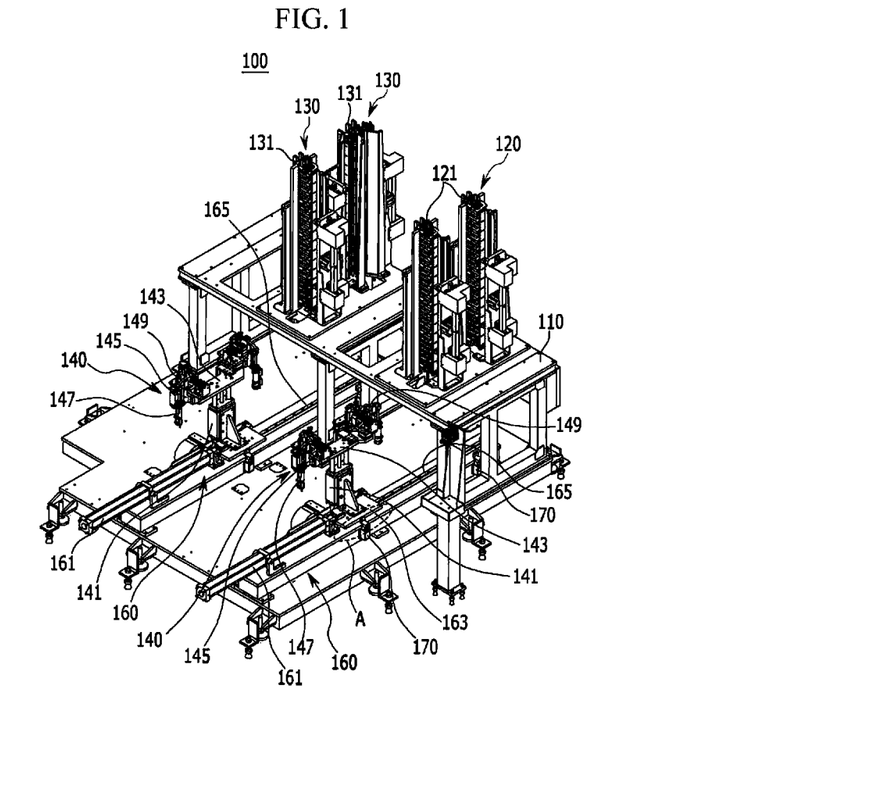
FIG. 1 is a front perspective view of a door hinge loading device for a vehicle according to an exemplary embodiment of the present invention.
Figure 2:
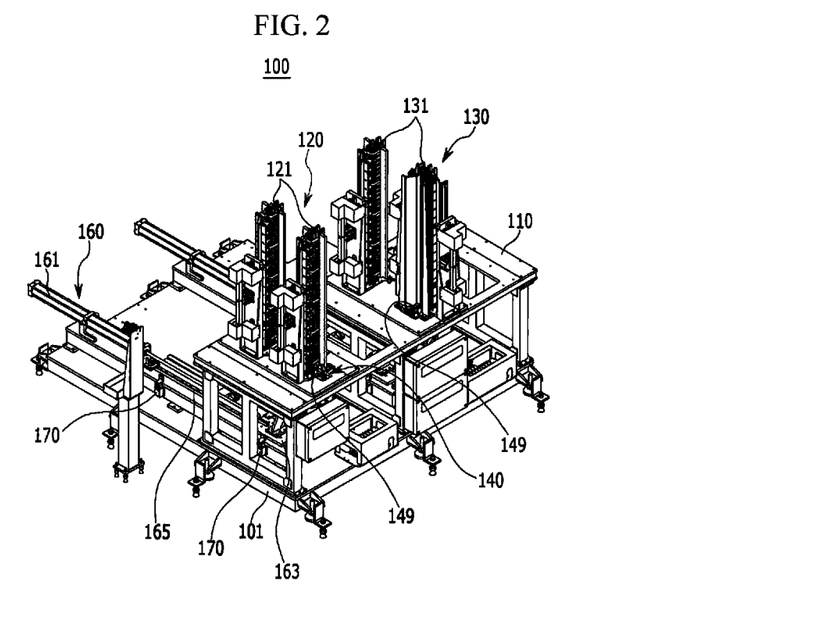
FIG. 2 is a rear perspective view of the door hinge loading device of FIG. 1.
Figure 3:
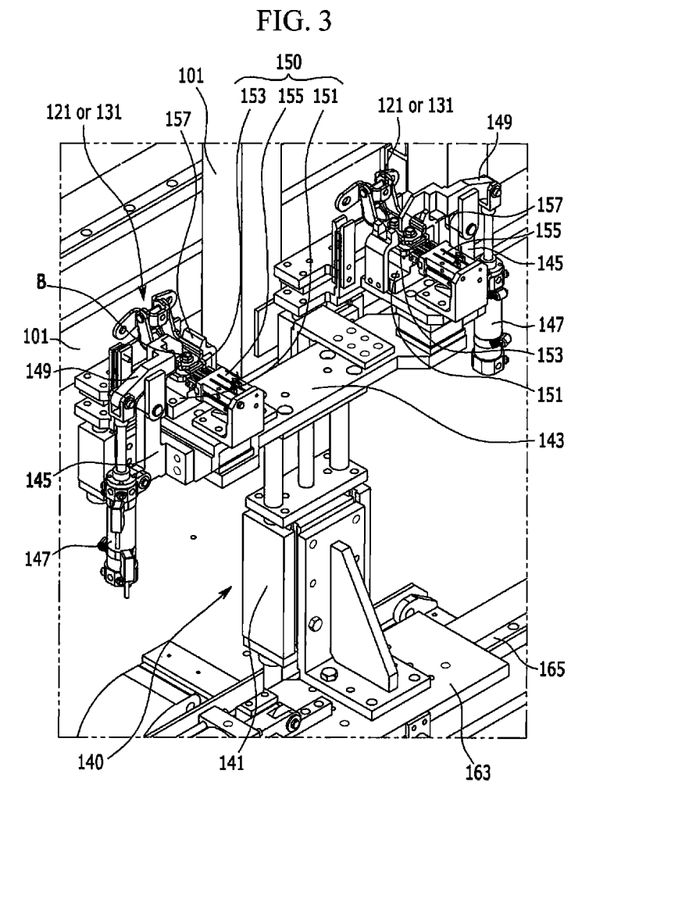
FIG. 3 is a perspective view of a clamping unit applied to the door hinge loading device of FIG. 1.
Figure 4:
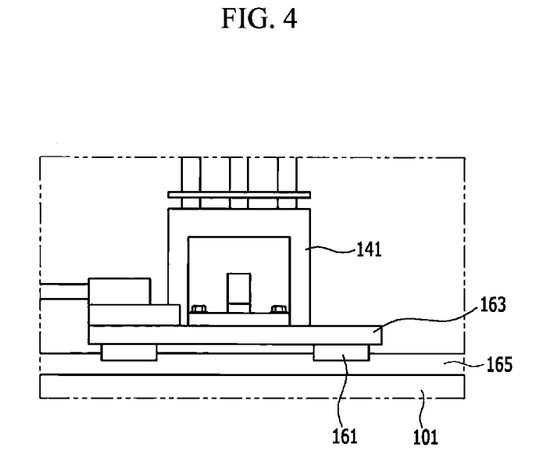
FIG. 4 is a side view of a portion A of FIG. 1.

FIGS. 1 and 2 are front and rear perspective views of a door hinge loading device for a vehicle according to an exemplary embodiment of the present invention, FIG. 3 is a perspective view of a clamping unit applied to the door hinge loading device of FIG. 1, and FIG. 4 is a side view of a portion A of FIG. 1.

Referring to the drawings, a door hinge loading device 100 for a vehicle according to an exemplary embodiment of the present invention is configured to load front and rear door hinges 121 and 131 to a moving range of an install robot while automatically extracting and aligning the front and rear door hinges 121, 131 loaded on hinge storages 120 and 130.

To achieve this, as illustrated in FIGS. 1 and 2, the door hinge loading device 100 for a vehicle according to the exemplary embodiment of the present invention includes a base plate 101, an attachment frame 110, the first and second door hinge storages 120 and 130, clamping units 140, and moving units 160.

Preferably, the base plate 101 is provided at a ground of a working place.

The attachment frame 110 is provided above the base plate 101.

In the present exemplary embodiment, the first door hinge storages 120 are paired with each other, and are attached to one side on the attachment frame 110. A plurality of front door hinges 121 is loaded on the first door hinge storages.

The second door hinge storages 130 are paired with each other, and are attached to the other side on the attachment frame 110 at positions spaced apart from the first door hinge storages 120. A plurality of rear door hinges 131 is loaded on the second door hinge storages.

Further, the clamping units 140 are paired with each other to correspond to the first and second door hinge storages 120 and 130, and extract the pair of front door hinges 121 and the pair of rear door hinges 131 from the first and second door hinge storages 120 and 130 to clamp the extracted front and rear door hinges while aligning bolts B.

Referring to FIG. 3, each of the clamping units 140 includes an up and down cylinder 141, an up and down plate 143, beaters 145, clamping cylinders 147, clampers 149, and alignment units 150.

The up and down cylinder 141 includes an operation rod, is connected to the moving unit 160, and is provided to be moved on the base plate 101 back and forth along with operation of the moving unit 160.

In the present exemplary embodiment, the up and down plate 143 is attached to the up and down cylinder 141 to be selectively moved up or down by the up and down cylinder 141.

The locaters 145 are attached to both ends of the up and down plate 143 in a longitudinal direction so as to correspond to positions of the first hinge storages 120 and the second hinge storages 130.

Each of the clamping cylinders 147 includes an operation rod, and one side thereof is hinge-connected to one side of the locater 145.

Further, one side of each of the clampers 149 is hinge-connected to a front end of the locater 145, and a rear end thereof is hinge-connected to the operation rod of the clamping cylinder 147.

Moreover, the alignment units 150 are provided so as to correspond to front ends of the clampers 149 on both sides of the up and down plate 143 in the longitudinal direction, and align the bolts B of the front door hinges 121 or the rear door hinges 131.

The alignment units 150 may include mounting blocks 151 mounted on both sides on a top surface of the up and down plate 143, and alignment cylinders 155 that clamp the bolts B attached to the front door hinges 121 or the rear door hinges 131 that are positioned on the mounting blocks 151 through bolt clampers 153 to align the bolts.

In particular, a guider 157 that respectively guides the front door hinges 121 and the rear door hinges 131 mounted above the mounting blocks 151 may be provided.

The guider 157 functions to guide the door hinges 121 or 131 extracted from the hinge storages 120 or 130 to be positioned at a center of the mounting block 151.

Further, the bolt clampers 153 may be moved toward the bolt B by the operation of the alignment cylinder 155 while being disposed at both sides with the bolt B interposed therebetween.

That is, the alignment units 150 having the aforementioned configuration clamps the door hinges 121 or 131 through the clamper 149 operated by the clamping cylinder 147 while the front or rear door hinges 121 or 131 are mounted on the mounting block 151, and fixes a lower part of the bolt B attached to the door hinges 121 or 131 through the bolt clampers 153 to align the hinges.

In particular, the alignment cylinder 155 moves the bolt clampers 153 disposed at both sides of the bolt B to the bolt B depending on whether or not an operation pressure is supplied.

In addition, the moving units 160 are provided at positions corresponding to the clamping units 140 above the base plate 101 to be connected to the clamping units 140, and selectively move the clamping units 140 toward the first or second door hinge storages 120 or 130 on the base plate 101.

As illustrated in FIGS. 1 and 2, each of the moving units 160 includes a moving cylinder 161, a moving plate 163, and a guide rail 165.

The moving cylinder 161 includes an operation rod, and a front end of the operation rod is attached onto a top surface of the base plate 101 toward the attachment frame 110 at a position corresponding to the clamping units 140.

In the present exemplary embodiment, the moving plate 163 is connected to a front end of the operation rod of the moving cylinder 161, and is provided to be slidably moved on the base plate 101. Further, the up and down cylinder 141 of the clamping unit 140 is attached to one side of the moving plate.

Further, the guide rail 165 guides movement of the moving plate 163 between the base plate 101 and the moving plate 163.

As illustrated in FIG. 4, the moving plate 163 may be connected to the guide rail 165 through a rail block 167 attached to the guide rail 165 above the guide rail 165.

When the front or rear door hinges 121 or 131 are extracted from the first hinge storages 120 or the second hinge storages 130, the moving unit 160 having the aforementioned configuration moves the clamping unit 140 toward the first or second hinge storages 120 or 130 by forward operation of the moving cylinder 161.

Thereafter, when the extraction and alignment of the front door hinges 121 or the rear door hinges 131 are finished through the clamping unit 140, the moving unit 160 positions the clamping unit 140 moved below the first or second hinge storages 120 or 130 within a moving range of an install robot that attaches the front or rear door hinges 121 or 131 to a vehicle body (not illustrated) on the base plate 101 by rearward operation of the moving cylinder 161.

Meanwhile, in the present exemplary embodiment, one or more detecting sensors 170 that detect positions of the clamping units 140 moved by the moving units 160 may be attached to the base plate 101.

The detecting sensors 170 may be provided at the base plate 101 at positions of the first and second door hinge storages 120 and 130, and positions where the front door hinges 121 and the rear door hinges 131 that are extracted from the first and second door hinge storages 120 and 130 are loaded by the install robot (not illustrated).

That is, when the clamping unit 140 is moved toward the first hinge storages 120 or the second hinge storages 130 by the operation of the moving unit 160, if the clamping unit 140 is positioned at the extraction position of the front door hinges 121 or the rear door hinges 131, the detecting sensor 170 among the detecting sensors 170, which is positioned at the position of the hinge storages 120 or 130, detects the position of the clamping unit 140 to stop the forward operation of the moving cylinder 161.

In such a state, when the extraction and alignment of the front or rear door hinges 121 or 131 are finished through the clamping unit 140 to be moved from below the attachment frame 110 toward the other side of the base plate 101 by the operation of the moving unit 160, if the clamping unit is positioned at a loading position of the install robot (not illustrated), the detecting sensor 170 among the detecting sensors 170, which is positioned at a side opposite to the attachment frame 110, detects the position of the clamping unit 140 to stop the rearward operation of the moving cylinder 161.

Accordingly, the detecting sensor 170 may allow the clamping unit 140 to be positioned at the position where the front or rear door hinges 121 or 131 are extracted and the position where the door hinges 121 or 131 are loaded by the install robot.

Next, operations and effects of the door hinge loading device 100 for a vehicle having the aforementioned configuration according to the exemplary embodiment of the present invention will be described in detail.

Figure 5:
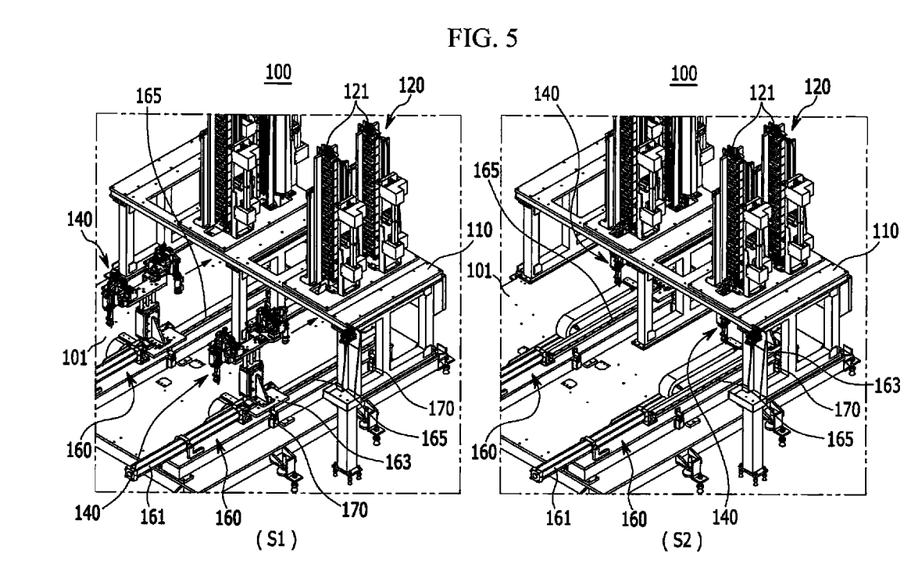
FIG. 5 is an operational state diagram of the door hinge loading device for a vehicle according to the exemplary embodiment of the present invention.

While the plurality of front door hinges 121 and the plurality of rear door hinges 131 are respectively loaded on the first hinge storages 120 and the second hinge storages 130, the moving cylinders 161 of the moving units 160 are operated forward to move the clamping units 140 below the attachment frame 110 as illustrated in (S1) of FIG. 5.

At this time, when the both alignment units 150 of the clamping units 140 are positioned at the first and second hinge storages 120 and 130, the detecting sensors 170 positioned on the base plate 101 below the attachment frame 110 detect the positions of the clamping units 140, so that a controller (not illustrated) stops the operations of the moving units.

In such a state, when the up and down cylinders 141 are operated to raise the up and down plates 143 and the door hinges 121 and 131 are mounted on the both alignment units 150 mounted on the raised up and down plates 143, the clamping units 140 clamp the door hinges 121 and 131 by the operations of the clamping cylinders 147.

Thereafter, the alignment units 150 operate the alignment cylinders 155, and the bolts B attached to the door hinges 121 and 131 are fixed by the bolt clampers 153, so that the extraction and clamping of the door hinges 121 and 131 and the alignment of the bolts B are finished.

When the alignment of the door hinges 121 and 131 is finished while being extracted and clamped by the clamping units 140, the up and down cylinders 141 of the clamping units 140 are lowered to return the up and down plates 143 to their initial positions. In such a state, as illustrated in (S2) of FIG. 5, the moving cylinders 161 of the moving units 160 are operated to move the clamping units 140 toward the other side of the base plate 101 from below the attachment frame 110.

At this time, when the clamping units 140 are positioned within the moving range of the install robot (not illustrated), the detecting sensors 170 positioned at the base plate 101 detect the positions of the clamping units 140 to output signals to the controller, and the controller stops the operations of the moving units 160 so as not to allow the moving cylinders 161 to be further moved rearward.

Accordingly, the clamping units 140 are moved by the operations of the moving units 160 while repeatedly performing the aforementioned operations to align the bolts B while extracting and clamping the front and rear door hinges 121 and 131 from the first and second hinge storages 120 and 130, and are positioned at the other side of the base plate 101 within the moving range of the install robot by the operations of the moving units 160. Thus, the door hinges 121 and 131 are automatically extracted from the first and second hinges storages 120 and 130 to be loaded.

Accordingly, unlike the conventional technology in which the door hinges 121 and 131 are manually aligned, in the door hinge loading device 100 for a vehicle having the aforementioned configuration according to the exemplary embodiment of the present invention, while the front and rear door hinges 121 and 131 loaded on the hinge storages 120 and 130 are extracted and aligned, the front and rear door hinges are clamped to be automatically loaded to the moving range of the install robot. Further, since the door hinge loading device can be used for door hinges having different sizes for different vehicle models, it is possible to apply the door hinge loading device to various vehicle models in common.

Further, in the exemplary embodiment of the present invention, since the bolts B of the door hinges 121 and 131 can be automatically aligned before the door hinges 121 and 131 are attached to the vehicle body, it is possible to improve productivity due to the attachment of the door hinges 121 and 131 to the vehicle body, and it is possible to reduce manufacturing cost such as labor cost of an operator due to manual labor.

When the door hinges 121 and 131 are attached by the install robot by automatically aligning the bolts B attached to the door hinges, since an assembly variation of the door hinges 121 and 131 is reduced, it is possible to further improve assembly quality. As a result, it is possible to prevent deformation of the door and a decrease in quality of an external appearance due to the assembly variation.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A door hinge loading device for a vehicle, comprising:
    a door hinge storage that is attached to an attachment frame, wherein one or more door hinges are loaded on the door hinge storage, wherein the door hinge storage includes:
        a pair of first door hinge storages attached to one side on the attachment frame, wherein a plurality of front door hinges are loaded on the pair of first door hinge storages; and
        a pair of second door hinge storages attached to the other side of the attachment frame at positions spaced apart from the first door hinge storages, wherein a plurality of rear door hinges are loaded on the pair of second door hinge storages;
    a clamping unit that extracts the door hinges from the door hinge storage, and clamps the extracted door hinges while aligning bolts, wherein the clamping unit includes bolt clampers disposed at both sides of each bolt with the bolt interposed therebetween, the bolt clampers configured to move toward the bolt by operation of alignment cylinders; and
    a moving unit that is provided at a position corresponding to the clamping unit, and selectively moves the clamping unit toward the door hinge storage, wherein the moving unit includes:
        a moving cylinder that includes an operation rod, and is provided on a top surface of a base plate at a position corresponding to the clamping unit;
        a moving plate that is connected to a front end of the operation rod of the moving cylinder, is provided to be slidably moved on the base plate, and mounts the clamping unit on one side thereof; and
        a guide rail that guides movement of the moving plate between the base plate and the moving plate.

2. The door hinge loading device for a vehicle of claim 1, wherein the attachment frame is provided on the base plate disposed at a ground of a working place.

3. The door hinge loading device for a vehicle of claim 2, wherein the clamping unit includes:
    an up and down cylinder that includes an operation rod, is connected to the moving unit, and is provided to be moved back and forth on the base plate along with operation of the moving unit;
    an up and down plate that is attached to the up and down cylinder to be selectively raised or lowered by the up and down cylinder;
    locaters that are respectively attached to both ends of the up and down plate in a longitudinal direction so as to correspond to a position of the hinge storage;

clamping cylinders that include operation rods, and are hinge-connected to the locaters;

dampers that are hinge-connected to front ends of the locaters and having rear ends that are hinge-connected to the operation rods of the clamping cylinders; and alignment units that are attached to both sides on the up and down plate in the longitudinal direction so as to correspond to front ends of the dampers, and align the bolts of the door hinges.

4. The door hinge loading device for a vehicle of claim 3, wherein the alignment units include:

mounting blocks that are respectively provided on both sides of a top surface of the up and down plate; and the alignment cylinders, which clamp the bolts attached to the door hinges that are respectively positioned on the mounting blocks through bolt dampers to align the bolts.

5. The door hinge loading device for a vehicle of claim 4, wherein the mounting blocks are provided with guiders that respectively guide the door hinges mounted on the mounting blocks.

6. The door hinge loading device for a vehicle of claim 1, wherein the moving plate is connected to the guide rail through a rail block attached to the guide rail on the guide rail.

7. The door hinge loading device for a vehicle of claim 1, wherein the base plate is provided with one or more detecting sensors that detect the position of the clamping unit moved by the moving unit.

8. The door hinge loading device for a vehicle of claim 7, wherein the detecting sensors are respectively provided on the base plate at a position of the door hinge storage and a position where the door hinges extracted from the door hinge storages are loaded.

9. A method of loading door hinges in manufacturing a vehicle, comprising:

loading one or more door hinges on a door hinge storage, the door hinge storage being attached to an attachment frame, wherein the door hinge storage includes:

a pair of first door hinge storages attached to one side on the attachment frame, wherein a plurality of front door hinges are loaded on the pair of first door hinge storages; and a pair of second door hinge storages attached to the other side of the attachment frame at positions spaced apart from the first door hinge storages, wherein a plurality of rear door hinges are loaded on the pair of second door hinge storages;

extracting the door hinges from the door hinge storage by a clamping unit, wherein the clamping unit includes bolt dampers disposed at both sides of each bolt with the bolt interposed therebetween, the bolt dampers configured to move toward the bolt by operation of alignment cylinders;

clamping the extracted door hinges while aligning bolts by the clamping unit; and selectively moving the clamping unit toward the door hinge storage by a moving unit that is provided at a position corresponding to the clamping unit, wherein the moving unit includes:

a moving cylinder that includes an operation rod, and is provided on a top surface of a base plate at a position corresponding to the clamping unit;

a moving plate that is connected to a front end of the operation rod of the moving cylinder, is provided to be slidably moved on the base plate, and mounts the clamping unit on one side thereof; and a guide rail that guides movement of the moving plate between the base plate and the moving plate.

* * * * *